May 15, 1962  W. P. HAINES, JR  3,034,607
AIRCRAFT HANGAR
Filed Oct. 20, 1958  5 Sheets-Sheet 4
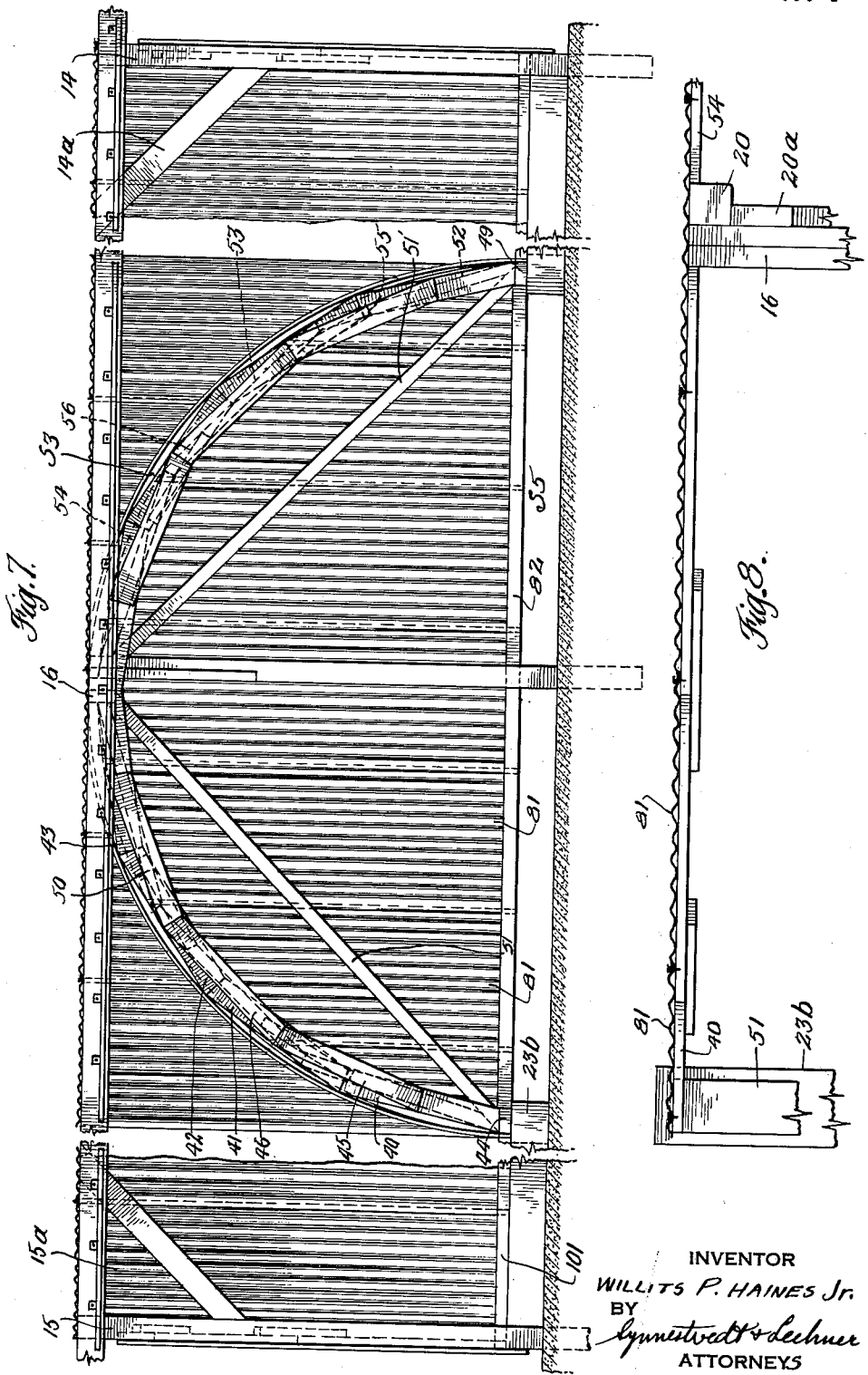
INVENTOR
WILLITS P. HAINES Jr.
BY
ATTORNEYS

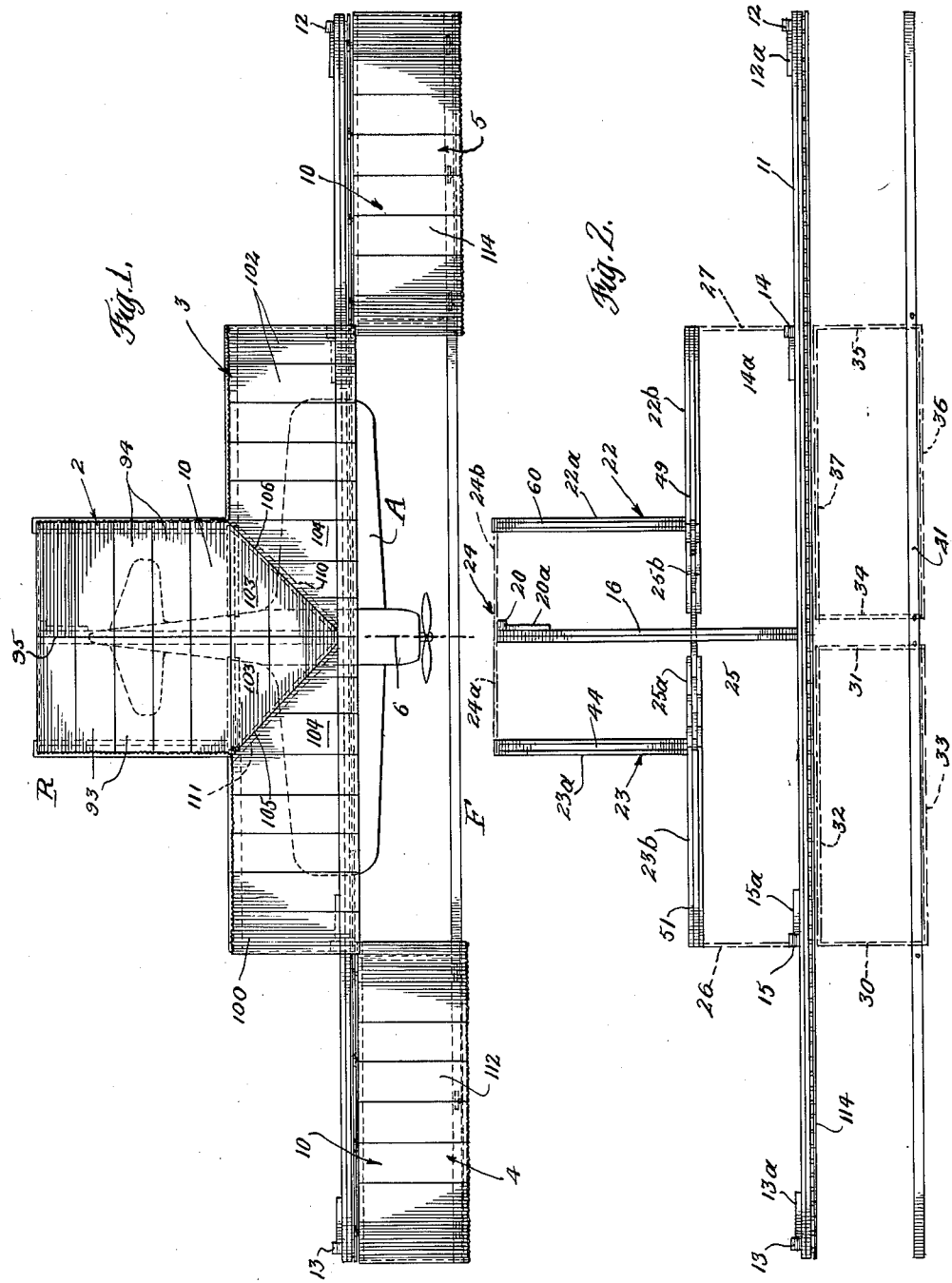

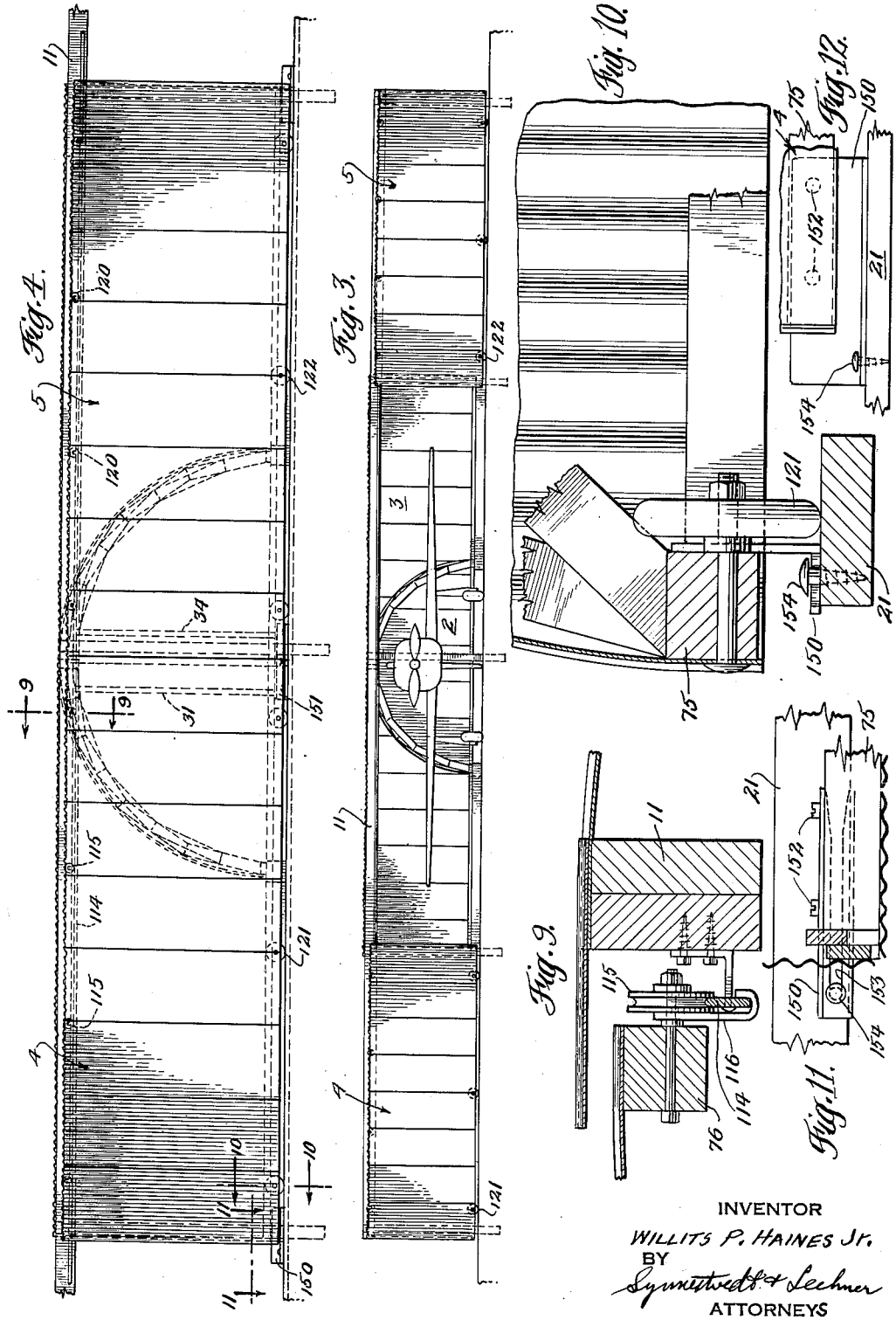

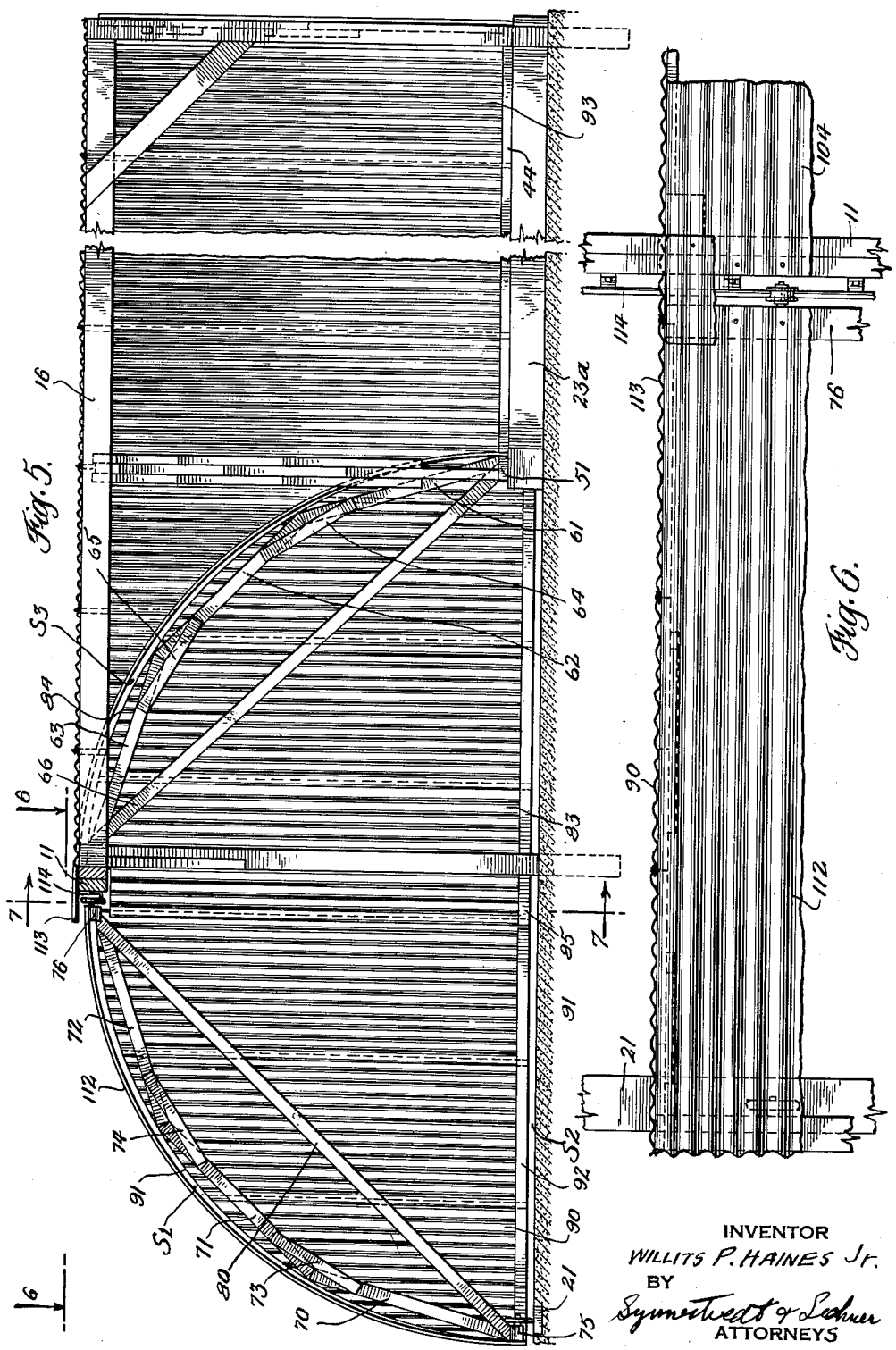

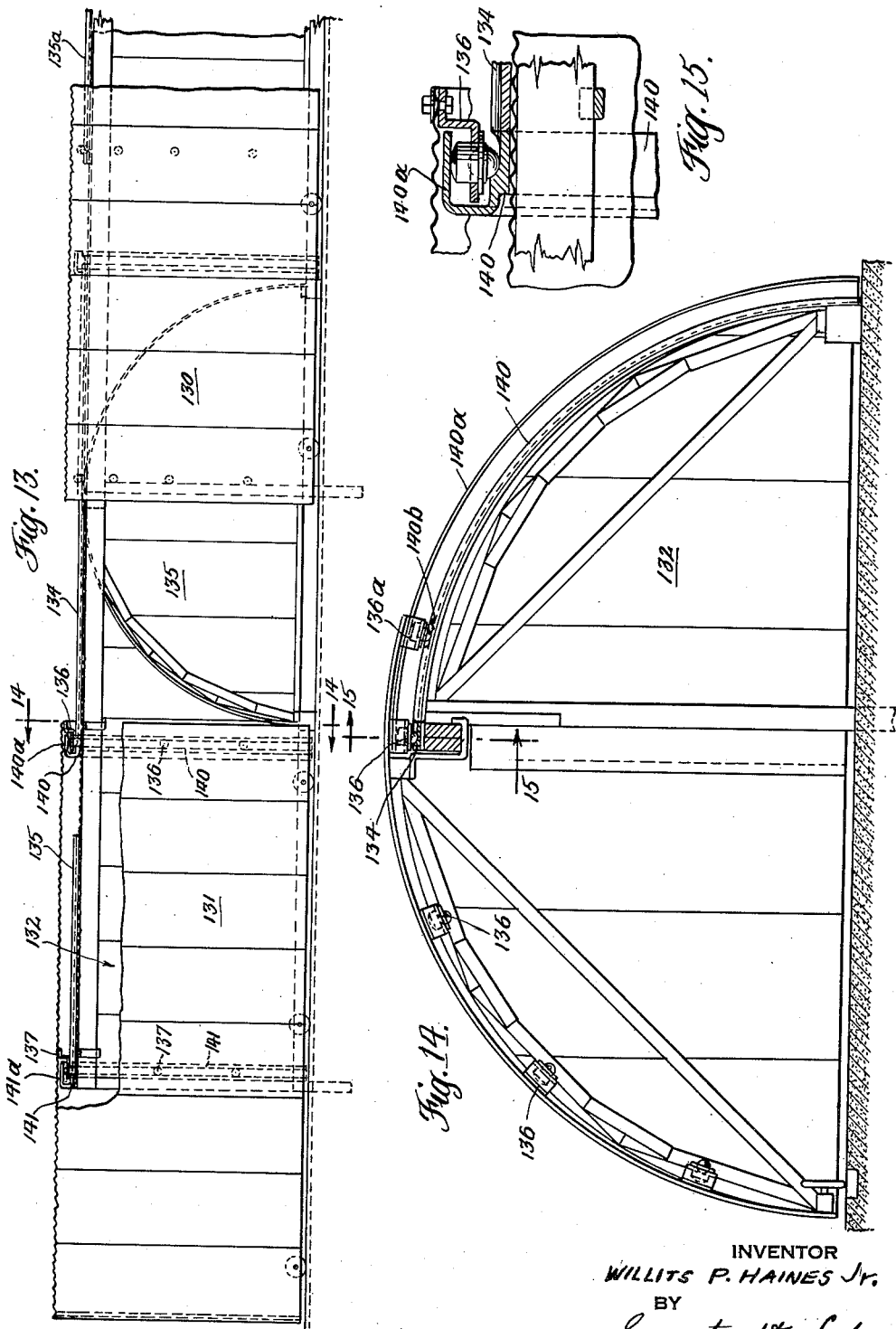

United States Patent Office 3,034,607
Patented May 15, 1962

3,034,607
AIRCRAFT HANGAR
Willits P. Haines, Jr., Prospectville, Pa.
(11191 Kensington Road, Rossmoor, Calif.)
Filed Oct. 20, 1958, Ser. No. 768,103
7 Claims. (Cl. 189—1.5)

This invention relates to aircraft hangars and, in particular, relates to a hangar especially suitable for the housing of relatively small private aircraft.

In one aspect the invention contemplates a hangar having a main body made up of rounded or arcuate sections, the body being adapted to house most of the wings and fuselage of the aircraft and having on its front side a pair of doors movable with respect to the main body to outboard positions to provide a space for moving the aircraft in and out of the main body and also movable to an inboard or closed position wherein the doors serve as a housing for the forward part of the aircraft, such as the wings and nose.

In another aspect the invention contemplates a hangar having a main body comprised of a wing section and a tail section arranged at right angles to each other, each being formed of rounded or arcuate sections, the main body being adapted to house most of the wings and fuselage of the aircraft and having on its front side a pair of rounded or arcuately-shaped doors movable outwardly of the wing section to a position providing a space for moving the aircraft in and out of the main body and also movable to an inboard or closed position wherein the doors serve as a housing for the forward part of the aircraft such as the wings and nose.

In another aspect the invention contemplates a hangar having a main body made up of a wing section and a tail section arranged at right angles to each other, each being formed of rounded or arcuate sections, the main body being adapted to house most of the wings and fuselage of the aircraft and having on its front side a pair of rounded or arcuately-shaped doors movable outwardly of each wing section and then up and over each wing section whereby to provide an open space so that the aircraft can be moved in and out of the main body, the doors also being movable to an inboard or closed position wherein the doors serve as a housing for the forward part of the aircraft such as the wings and nose.

In another aspect the invention contemplates an aircraft hangar made up of a simplified yet highly rugged frame structure over which there is disposed corrugated siding plates cooperating with the frame in making a light-weight yet strong structure.

In another aspect the invention contemplates a main support beam held in position by a plurality of upright columns and cooperating with a secondary support beam extending normal thereto, the beams serving as top anchor points for arcuately-shaped siding extending downwardly therefrom and the main beam further acting as a support for a pair of movable doors.

In another aspect the invention contemplates an aircraft hangar made up of arcuately-shaped siding, the siding being supported in part by simplified yet strong arch structures made up of sector beams laid end to end, the adjacent beams being connected by sector supports and the opposite ends of the sector beams being connected by a main sector beam.

In another aspect the invention contemplates framing for an aircraft hangar door made up of a pair of arch structures tied together by cross beams.

In another aspect the invention contemplates framing for an aircraft hangar including a pair of top support beams arranged in the form of a T and held in position by a minimum number of upright columns together with cooperating arch structure, the support beams and arch structure serving as mounting means for the corrugated siding.

The manner in which the invention is constructed and certain features thereof will be apparent from the following description and drawings wherein:

FIGURE 1 is a plan view of the hangar of the invention and showing the aircraft disposed in the hangar and with the doors in open position;

FIGURE 2 is a plan view of certain portions of the framing of the invention;

FIGURE 3 is a front view of FIGURE 1;

FIGURE 4 is an enlarged front view of the hangar showing the doors in closed position;

FIGURE 5 is an enlarged sectional elevational view showing portions of the main body and one of the doors;

FIGURE 6 is a view taken along the line 6—6 of FIGURE 5;

FIGURE 7 is a view taken along the line 7—7 of FIGURE 5;

FIGURE 8 is a fragmentary view showing in particular the manner in which the siding is attached;

FIGURE 9 is an enlarged view taken along the line 9—9 of FIGURE 4;

FIGURE 10 is an enlarged view taken along the line 10—10 of FIGURE 4;

FIGURE 11 is an enlarged view taken along the line 11—11 of FIGURE 4;

FIGURE 12 is a view looking upward in FIGURE 11;

FIGURE 13 is a front elevational view showing a modification of the manner in which the doors are moved to the outboard or open position;

FIGURE 14 is a view taken along the line 14—14 of FIGURE 13; and

FIGURE 15 is a view taken along the line 15—15 of FIGURE 14.

In FIGURE 1 the letter F designates the front side of the hangar and the letter R designates the rear side of the hangar.

In FIGURE 1 the hangar has a main body 1 comprised of a tail section 2 and a wing section 3. The tail section is connected to the wing section generally centrally thereof and extends rearwardly at right angles to the wing section. Movably mounted on the wing section are a pair of doors 4 and 5 which when moved to the open position as shown, permit the aircraft A to be moved in or out of the hangar.

In the position of the aircraft as shown it will be observed that the tail section 2 houses the tail and part of the fuselage of the aircraft. The wing section houses part of the wings and fuselage of the aircraft. When the doors have been moved to closed position, for example when the inner edges of the doors are moved so that they occupy positions generally indicated by the dotted line 6 or as shown in FIGURE 4, the doors then house part of the wings and fuselage. As will be apparent from an inspection of FIGURES 5 and 7, the hangar has corrugated siding which in FIGURE 1 is generally indicated by the numeral 10. Preferably the siding is made of aluminum because it is light in weight, easy to work and tends to reflect a good deal of the radiant heat of the summer sun.

The general structure of the hangar of the invention as just described, i.e. the main body comprising the wing section and tail section together with the movable doors, is an important part of the invention because it makes for an overall structure which is small and compact yet providing ample room for housing the aircraft and for walking around the same. Further, the concept of providing movable doors as described is important because it provides for compactness, sturdiness and convenient accessibility.

The framing for the hangar is an important part of the invention and this will be described below.

As best seen in FIGURES 2 and 4, there is a main beam 11 which is supported by two outboard columns 12 and 13 together with two inboard columns 14 and 15. As indicated in FIGURES 3 and 4, these columns are sunk into the ground, preferably being held in place by an aggregate of concrete and stone, not shown. Between each column and the main beam there are braces such as indicated at 12a, 13a, 14a and 15a. Connected to the main beam at the center thereof there is a secondary beam 16 which is normal to the main beam and extends rearwardly. The column 20 supports the secondary beam at its free end. Between the column 20 and the secondary beam 16 there is a brace 20a. In front of the main beam there is a deck plate 21 which, as best seen in FIGURE 5, is sunk into the ground.

To the rear of the main beam there are a pair of deck supports generally indicated by the numerals 22 and 23. As shown in FIGURES 5 and 7, these supports are disposed on the ground. The support 22 has a first leg 22a which runs parallel to the secondary beam 16 and a second leg 22b which runs parallel to the main beam. The deck support 23 has similar legs 23a and 23b. The legs 22a and 23a are spaced substantially the same distance from the secondary beam 16.

Connected between the legs 22a and 23a and the secondary beam 16 there is an arch structure generally indicated by the numeral 24. This has a left-hand part 24a and a right-hand part 24b. Inwardly toward the main beam 11 there is an arch structure 25 having left-hand part 25a connected between the leg 23b and the beam 16 and a right-hand part 25b which is connected between the leg 22b and the beam 16.

Outboard of the secondary beam there are the arch structures 26 and 27 which are respectively connected between the leg 23b and the main beam 11 and the leg 22b and the main beam 11.

The foregoing constitutes the framework for the main body of the hangar. The framework for the left-hand door comprises the arch structures 30 and 31 which extend between the deck plate 21 and the main beam 11. The arch structures are identical in form and are connected on the top side by the cross beam 32 and on the lower side by the cross beam 33. The right-hand door has arch structures 34 and 35 connected at the bottom by the cross beam 36 and on the top by the cross beam 37.

Each of the arch structures are closely similar in form and differ mainly in the size of the component parts.

The arch structure 25 has the largest component parts since more structural strength is needed at this point. The parts 25a and 25b are similar and reference need only be made to part 25a. This structure is shown in FIGURE 7 and comprises a plurality of sector beams 40, 41, 42 and 43 which are connected end to end. The lower sector beam 40 is disposed on the sill 44 connected to the leg 23b and the top sector beam 43 is connected to the secondary beam 16. The sector beams are securely tied together by sector supports, the sector support 45 connecting the beams 40 and 41, the sector support 46 connecting the beams 41 and 42 and the sector support 50 connecting the beams 42 and 43. The arch structure 25b is formed in a similar manner. A main sector beam 51 is connected at the bottom to sill 44 and sector beam 45 and at the top to secondary beam 16 and upper sector beam 50.

The parts 24a and 24b of the arch structure 24 are similar to each other and to those just described, and reference need only be made with respect to the part 24b which in FIGURE 7 comprises a plurality of sector beams 52, 53 and 54 which are tied together by the sector supports 55 and 56. The lower sector beam 52 is connected to the sill 49 and the upper sector beam 54 is connected to the secondary beam 16. This arch structure has a main sector beam 51' similar to beam 51 which is connected at the bottom to sill 49 and sector beam 52, and on the top to secondary beam 16 and to upper sector beam 54.

The arch structure 26 is best seen in FIGURE 5 and comprises a plurality of sector beams 61, 62 and 63 tied together by the sector supports 64 and 65. The lower sector beam is connected to the sill 51 and the upper sector beam 63 is connected to the main beam 11. The main sector beam 66 extends between the sill 51 and the main beam 11. The main sector beam 66 is connected on the bottom to sill 51 and lower sector beam 61, and at the top side is connected to the main beam 11 and sector beam 63. The arch structure 27 is identical in construction.

The arch structures 30, 31, 34 and 35 for the doors are all similar in construction and only the structure 30 will be described in detail. As shown in FIGURE 5, this comprises a plurality of sector beams 70, 71 and 72 tied together by the sector supports 73 and 74. The lower sector beam 70 is connected to the lower cross beam 75 which extends parallel to the deck plate 21 and is connected to the arch structure 35. The upper sector beam 72 is connected to the upper cross rail 76 which extends parallel to the main beam 11 and is connected to the arch structure 35. The main sector support 80 extends between and is connected to the cross beams 75 and 76 and also to the sector beams 70 and 72. In the structures 31 and 34 the main sector supports (like support 80) may be eliminated in order to give more clearance space inside the hangar.

From the foregoing description it will be seen that I have provided a highly simplified frame structure which has a minimum number of components, is simple to fabricate and is very easy to erect.

The frame structure is adapted to support certain straight and arcuately formed siding which will next be described.

Referring to FIGURE 7, the siding comprises a plurality of straight sheets 81, the top peripheral edges of which are arcuately formed and are attached to the arch structure 24 as indicated in FIGURE 8. Preferably the adjacent edges of the sheets are overlapped. On the bottom the siding is attached to a re-enforcing strip 82 which extends between the sills 44 and 60.

Straight siding is also attached to the arch structures 26 and 27. The siding for the arch structure 26 is shown in FIGURE 5 and comprises a plurality of sheets 83, the top peripheral edges of which are arcuately formed as indicated by the numeral 84 and are overlapped and secured to the arch structure in a manner as described just above. On the bottom, the siding sheets are connected to a re-enforcing strip 85. The siding for the arch structure 27 is similar to that just described.

Straight siding is also connected to the arch structures 30 and 31 for the left-hand door 4 and to the arch structures 34 and 35 for the right-hand door 5. The manner in which this is done is shown in FIGURE 5 for the arch structure 30. The siding comprises a plurality of sheets 90, the top peripheral edges of which are arcuately formed at 91 and attached to the arch structure 30. On the bottom the sheets are attached to the re-enforcing strip 92. As seen in FIGURE 5, the siding sheets 83 on the arch structure 26 overlap the siding sheets 90 on the door.

Arcuately-shaped siding is adapted to be attached to the main body of the hangar as described following.

As best seen in FIGURE 1, the tail section 2 has a plurality of sheets 93 which, as seen in FIGURE 5, are at the bottom, connected to the sill 44 and, on the top, are connected to the secondary beam 16. The right-hand side of the wing section has a plurality of similar siding sheets 94. On the top the sheets 93 and 94 are overlapped generally along the line 95.

The wing section 3 has a plurality of arcuate siding sheets 100 which are connected to the sill 51 on the leg 23b and on the top are connected to the main beam 11.

Similar sheets 102 are provided on the right-hand side of the wing section.

At the joinder point of the tail and wing sections the tail section has a plurality of siding sheets 103 which, at the top, are connected to the secondary beam 16 and the wing section has a plurality of similar sheets 104 which, at the top, are connected to the main beam 11. These sheets 103 and 104 are mitered along the lines 105 and 106. The sheets 103 and 104 are tied together at the miter 106 by a gutter 110 which is preferably bolted to the sheets. On the left-hand side the sheets 104 are tied together by a gutter 111. For reasons of clarity the gutters 110 and 111 are shown only on FIGURE 1.

The doors have similar arcuate siding sheets which are connected between the upper and lower cross rails. For example, as best seen in FIGURE 5, the siding plates 112 for the left-hand door are connected between the lower cross beam 75 and the upper cross beam 76. If desired, a rain shield 113 may extend along the main beam 11 for the length of the wing section and project forwardly to overlap the plates 112 on the left-hand door and the plates 114 on the right-hand door.

If a hangar of the kind described, it is necessary to provide a maximum of air circulation and in order to avoid condensation of moisture on the aircraft housed therein. In the construction above described, the peripheral edges of the straight siding sheets and the arcuate siding sheets are arranged to be spaced from one another, for example, on the doors (FIGURE 5) it will be seen that the upper peripheral edge of the sheets 90 is spaced from the edges of the sheet 112 so as to form a vent space S-1. Also, it will be observed that on the door the lower cross beam 75 and the strip 92 are raised from the ground to form the space S-2. A similar construction applies to the right-hand door. Also, in FIGURE 5 it will be seen that the straight sheets 83 on the arch structure 26 and the sheets 100 on the left-hand wing section are arranged to form the space S-3. Also, the strip 83 is raised from the ground to form a continuation of the space S-2. Similar spaces are provided by the straight side sheets on the arch structure 27 and the sheets 102 on the right-hand side of the wing section.

A similar spacing arrangement is provided by the sheets 81 on the arch structure 24 and the arcuate sheets 93 and 94. As seen in FIGURE 4, this arrangement forms the spaces S-3 and S-4. On the bottom it will be noted that the strip 82 is raised from the ground and forms a vent space S-5.

The manner in which the doors are adapted to be moved will be described following.

As best seen in FIGURES 2, 5 and 9, the main beam 11 has a track 114 which is secured thereto and extends throughout its full length. The upper cross beam 76 of the left-hand door carries a plurality of rollers 115 cooperating with the track 114 together with a guard 116 which extends beneath the track 114 and prevents the rollers from being raised off the track. The right-hand door has similar rollers 120. On the left-hand door the lower cross beam supports a plurality of wheels 121 which ride on the deck plate 21 (see FIGURE 10). The right-hand door has similar wheels 122 also riding on the deck plate. The wheels and rollers as above described permit the doors to be freely moved to open or closed position.

In FIGURES 13, 14 and 15 I have shown a modified arrangement for moving the doors. The hangar shown in these views is similar in construction to the hangar described above, except as will appear in the following.

In FIGURE 13 the right-hand door 130 is shown in its innermost or closed position and the left-hand door 131 is shown moved to its farthest position toward the left. In this position the door 130 may be raised up and over the wing section 132. In this manner the whole left-hand half of the wing section is completely open. When the right-hand door 130 is moved to the right and then up and over the right-hand part of the wing section, the main body of the hangar is completely open and the aircraft can be freely moved in or out.

The structure for providing the above-described motions will next be described in connection with the left-hand door 131. The right-hand door 130 has identical structure.

The wing section is provided with a track 134 which extends from the center of the wing section outwardly to the left and right to just beyond the edge of the left and right-hand parts of the tail section 135. On the outboard side of the wing section are mounted tracks 135 and 135a. As indicated the tracks are mounted on top of the corrugated siding. The left-hand door carries a plurality of casters 136 and a plurality of casters 137 located outboard. The topmost casters 136 and 137 are respectively adapted to slide in the tracks 134 and 135. This arrangement provides for motion of the door parallel to the wing section from the central position to the outboard position. The left-hand part of the wing section is provided with a pair of tracks 140 and 141 which are joined respectively to the tracks 134 and 135 and extend downwardly as shown in FIGURE 14. The track 140 is adapted to cooperate with the casters 136 and the track 141 is adapted to cooperate with the casters 137. The track 140 has a channel 140a and the track 141 has a channel 141a which cooperate with the casters 136 and 137 as is shown in FIGURE 15 to prevent the same from moving out of the tracks. When the left-hand door is in the position shown, it may be raised upwardly so that the casters 136 slide down the track 140 and the casters 137 slide down the track 141. Each of the tracks 140 and 141 is notched to provide for transverse motion of the casters on the wing section of the hangar. This is shown in FIGURE 14 where the track 140 has a notch 140b for the caster labeled 136a. A similar arrangement is provided in the track 141 for the caster corresponding to 136a.

In the above-described construction the main beam 11 and the deck plate 21 may be shortened since the door does not have to move out to its full width.

Referring back to the hangar as shown in FIGURES 1–12, I have provided means to stop each door at the end of its inboard and outboard travel. Each door has the same arrangement and only that for the left-hand door will be described.

As seen in FIGURE 4, the left-hand door 4 has attached thereto a pair of cleats 150 and 151. Each cleat is secured to the lower cross rail 75 as by bolts 152 for the cleat 150 (see FIGURES 11 and 12). The cleat 150 has a channel 153 (FIGURE 12) and the cleat 151 has a similar channel. Each of the cleats is arranged to cooperate with studs in the deck plate 21, for example the stud 154 for the cleat 150.

When the door is moved inboard, the studs engage the dead-end of the channels as is indicated in FIGURE 12 so that the inboard motion of the door is stopped. This is the closed position. In addition to serving as a stop, it is pointed out that the channels and studs cooperate to serve as means for guiding the door to the closed position.

When the door is moved outboard, it ordinarily need not be moved to the farthermost outboard position. However, where the latter occurs, the cleat 151 will engage the stud 154 so that the door motion is stopped.

I claim:

1. In an aircraft hangar: a horizontally-extending main beam; four columns supporting said beam, two of the columns being disposed at opposite ends of the beam and the other two being disposed inboard and equally spaced from the center of the beam; a horizontally-disposed secondary beam secured to the main beam at the center thereof and extending outwardly at right angles therefrom; a rear column supporting said secondary beam at the free end thereof; a pair of deck supports each having a pair of legs arranged in the form of an L, the first leg of each extending parallel to said secondary beam and the second leg of each extending parallel to said main beam; a first arch structure connected to said rear column and each of said first legs, second and third arch structures respectively connected to said second legs and said main beam substantially at the point of connection of said inboard columns; a deck plate spaced from and extending parallel to said main beam; track means connected to and extending along said main beam; a pair of door frames each frame including: inner and outer arch structures extending between said deck plate and said main beam, an upper cross beam extending adjacent the main beam and interconnecting the arch structures, and a lower cross beam extending adjacent the deck plate and interconnecting the arch structures; a plurality of rollers connected to the upper beam of each door frame and cooperating with said track; and a plurality of wheels connected to the lower cross beam of each door frame and riding on said deck plate.

2. A construction in accordance with claim 1 further including straight corrugated siding connected as follows: on each of said first, second and third arch structures and on each of the outer arch structures of said door frames; and arcuate corrugated side connected as follows: between each of said first legs and said secondary beam, between each of said second legs and said main beam and between the upper and lower cross beams of each of said door frames.

3. A construction in accordance with claim 2 wherein the straight and arcuate sidings are constructed and arranged to be spaced from one another at adjacent peripheral edges whereby to provide air vents.

4. A construction in accordance with claim 1 wherein each of said arch structures includes a plurality of end-to-end sector beams and a plurality of sector supports extending between adjacent sector beams.

5. A construction in accordance with claim 4 further including for some of said arch structures, a main sector beam interconnecting opposite ends of said sector beams.

6. In an aircraft hangar: a horizontally-extending main beam; four columns supporting said beam, two of the columns being disposed at opposite ends of the beam and the other two being disposed inboard and equally spaced from the center of the beam; a horizontally-disposed secondary beam secured to the main beam at the center thereof and extending outwardly at right angles therefrom; a rear column supporting said secondary beam at the free end thereof; a pair of deck supports each having a pair of legs arranged in the form of an L, the first leg of each extending parallel to said secondary beam and the second leg of each extending parallel to said main beam; a first arch structure connected to said rear column and each of said first legs, second and third arch structures respectively connected to said second legs and said main beam substantially at the point of connection of said inboard columns; a deck plate spaced from and extending parallel to said main beam; first track means connected to and extending along said main beam and second track means connected to and extending between said main beam and each of said second legs; a pair of door frames each frame including: inner and outer arch structures extending between said deck plate and said main beam, an upper cross beam extending adjacent the main beam and interconnecting the arch structures, and a lower cross beam extending adjacent the deck plate and interconnecting the arch structures; a plurality of rollers on each of said door frames and respectively disposed to cooperate with said first and second track means; and a plurality of wheels connected to the lower cross beam of each door frame and riding on said deck plate, said wheels, rollers and track means cooperating to provide for movement of each of said door frames as follows: movement parallel to said main beam and then movement upward and over said main beam.

7. A generally T-shaped aircraft hangar comprising: a main body having a tail section and an interconnected wing section arranged normally to each other generally in the form of a T, the tail section being for use in housing the tail and part of the fuselage of an aircraft and the wing section being for use in housing part of the fuselage and wings of the aircraft; a pair of movable doors respectively connected to said wing section and movable to a closed position and to an open position; and track means on said wing section providing for movement of each door to its open position as follows: movement parallel to its wing section to a position wherein the spacing between the doors is less than the wing span of the housed aircraft so that the same could not be moved outwardly through the space and then movement upward and over last said wing section to the open position wherein the aircraft can be moved outwardly of the hangar without interference from the doors.

References Cited in the file of this patent

UNITED STATES PATENTS

| | | |
|---|---|---|
| D. 139,082 | Larkin | Oct. 10, 1944 |
| 1,109,648 | Kauertz | Sept. 1, 1914 |
| 1,470,557 | Eremeeff | Oct. 9, 1923 |
| 1,861,069 | Smith | May 31, 1932 |
| 1,970,222 | Bryne | Aug. 14, 1934 |
| 2,532,456 | Merritt | Dec. 5, 1950 |
| 2,556,617 | Harrah | June 12, 1951 |

FOREIGN PATENTS

| | | |
|---|---|---|
| 604,932 | Great Britain | July 13, 1948 |